United States Patent
Heilek et al.

(10) Patent No.: US 7,762,404 B2
(45) Date of Patent: Jul. 27, 2010

(54) DEVICE FOR PERFORMING THE PURIFYING SEPARATION OF CRYSTALS OUT OF THEIR SUSPENSION IN A CONTAMINATED CRYSTAL MELT

(75) Inventors: Joerg Heilek, Bammental (DE); Dieter Baumann, Walldorf (DE); Bernd Eck, Viernheim (DE); Ulrich Hammon, Mannheim (DE); Klaus Joachim Mueller-Engel, Stutensee (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1048 days.

(21) Appl. No.: 10/494,046

(22) PCT Filed: Nov. 8, 2002

(86) PCT No.: PCT/EP02/12499

§ 371 (c)(1),
(2), (4) Date: May 11, 2004

(87) PCT Pub. No.: WO03/041833

PCT Pub. Date: May 22, 2003

(65) Prior Publication Data
US 2005/0006299 A1  Jan. 13, 2005

(30) Foreign Application Priority Data
Nov. 15, 2001  (DE) .............................. 101 56 016

(51) Int. Cl.
*B01D 29/88* (2006.01)
*B01D 33/70* (2006.01)
*B01D 35/00* (2006.01)

(52) U.S. Cl. ............... 210/456; 210/323.1; 210/435; 210/497.01; 562/600

(58) Field of Classification Search ............ 210/323.1, 210/323.2, 325, 326, 334, 340, 433, 497.3, 210/451, 446, 433.1; 422/251; 562/512, 562/531, 598; 23/295, 308, 30; 65/32.3; 75/10.11; 134/13; 117/206, 216; 159/45
See application file for complete search history.

(56) References Cited

U.S. PATENT DOCUMENTS

| | | | |
|---|---|---|---|
| 3,628,917 A | | 12/1971 | Nault et al. |
| 3,777,892 A | | 12/1973 | Thijssen et al. |
| 3,872,009 A | | 3/1975 | Thijssen |
| 5,102,544 A | * | 4/1992 | Roodenrijs ............. 210/296 |
| 5,797,989 A | * | 8/1998 | Geissbuehler et al. ..... 117/206 |
| 6,890,441 B2 | * | 5/2005 | Jansens et al. ........... 210/634 |
| 7,112,695 B2 | * | 9/2006 | Eck et al. ............... 562/600 |

FOREIGN PATENT DOCUMENTS

| | | |
|---|---|---|
| DE | 100 17 903 | 10/2001 |
| EP | 0 097 405 | 1/1984 |
| EP | 0 098 637 | 1/1984 |
| EP | 0 175 401 | 3/1986 |
| EP | 0 305 316 | 3/1989 |
| EP | 0 398 437 | 11/1990 |
| WO | 01/77056 | 10/2001 |

* cited by examiner

*Primary Examiner*—Duane Smith
*Assistant Examiner*—Benjamin Kurtz
(74) *Attorney, Agent, or Firm*—Oblon, Spivak, McClelland, Maier & Neustadt, L.L.P.

(57) ABSTRACT

An apparatus for separating crystals from their suspension in contaminated crystal melt with purification, in which a hydraulic wash column has distributor aids in a distributor space.

21 Claims, 8 Drawing Sheets

DEVICE FOR PERFORMING THE PURIFYING SEPARATION OF CRYSTALS OUT OF THEIR SUSPENSION IN A CONTAMINATED CRYSTAL MELT

The present invention relates to an apparatus for separating crystals from their suspension in contaminated crystal melt with purification, which has a hollow cylindrical column (45) which bounds a concentration zone and a wash zone;

one or more filter tubes (7) extending through the column from the first end of the column (45) parallel to the cylinder axis;

at least one filter (6) which forms the only direct connection between the interior of the tube and the interior of the column (45) being mounted in the wall of a filter tube (7);

the concentration zone being terminated at that first end of the column which is opposite the filters (6) by a tray (12) having orifices;

a first part of the orifices of the tray (12) being continued, on the one hand, into the filter tubes (7) and, on the other hand, simultaneously (on the opposite side of the orifice) into an apparatus (5) for removing contaminated crystal melt;

a second part of the orifices of the tray (12) being connected to a distributor space (18) into which the crystal suspension to be separated is fed; and the column (45) opening, at its second end opposite the first end, into a zone (46) for melting crystals which have been separated off, which zone has an outlet (32) for removing a portion of the molten crystals separated off.

The present invention furthermore relates to the use of such an apparatus for separating crystals (in particular acrylic acid crystals) from their suspension in contaminated crystal melt (in particular contaminated acrylic acid) with purification The numerical references in this document always relate to the figures attached to this document.

In this document, the terms cylindrical and tubular are to be understood as including all geometric shapes (bodies) whose cross section is circular or circle-like (e.g. elliptical or polygonal (e.g. a regular square, hexagon or octagon)).

In this document, the term contaminated crystal melt is to be understood as including melts of the component to be crystallized and impurities and/or solutions of the component to be crystallized and solvents or solvent mixtures and impurities.

Apparatuses according to the preamble of this document are known (cf. for example EP-B 97405) and they are recommended, inter alia, as hydraulic wash columns for separating crystals from their suspension in contaminated crystal melt with purification (cf. for example DE-A 100 179 03 and WO-0177056). This recommendation applies in particular to the separation of acrylic acid crystals from their suspension in contaminated acrylic acid with purification.

However, the disadvantage of the apparatuses recommended in the prior art is that the purification effect achieved by means of them is not completely satisfactory.

It is an object of the present invention to provide an improved apparatus for separating crystals from their suspension in contaminated crystal melt with purification.

We have found that this object is achieved by an apparatus for separating crystals from their suspension in contaminated crystal melt with purification, which has a hollow cylindrical column (45) which bounds a concentration zone and a wash zone;

one or more filter tubes (7) extending through the column from the first end of the column (45) parallel to the cylinder axis;

at least one filter (6) which forms the only direct connection between the interior of the tube and the interior of the column (45) being mounted in the wall of a filter tube (7);

the concentration zone being terminated, at that first end of the column which is opposite the filters (6), by a tray (12) having orifices;

a first part of the orifices of the tray (12) being continued, on the one hand, into the filter tube (7) and, on the other hand, simultaneously (on the opposite side of the orifice) into an apparatus (5) for removing contaminated crystal melt;

a second part of the orifices of the tray (12) being connected to a distributor space (18) into which the crystal suspension to be separated is fed; and the column (45) opening, at its second end opposite the first end, into a zone (46) for melting crystals which have been separated off, which zone has an outlet (32) for removing a portion of the molten crystals which have been separated off, wherein the interior of the distributor space is equipped with at least one distributor aid (1, 44).

In this document, distributor aid is understood as meaning any structural element in the distributor space which is capable of ensuring that a crystal suspension which is very uniform over the total cross section of the column is fed to the second part of the orifices of the tray (12).

In this document, a tray which has orifices and forms the boundary between the distributor space (18) and the concentration zone is not intended to be subsumed under the term distributor aid.

On the other hand, for example, perforated trays or packings mounted within the distributor space could be assigned to the general term distributor aid.

Wash columns are also disclosed in EP-A 398437, EP-A 98637, EP-A 305316, U.S. Pat. Nos. 3,87,2009 and 3,77, 7892.

The present invention is based on the knowledge obtained in detailed investigations ensuring that a crystal suspension to be separated separates (is classified) to a certain extent (for example because crystals of different sizes have different tendencies to settle out) on its way through the distributor space to the second part of the orifices of the tray (12). For example, a flow profile which is inhomogeneous over the cross section of the distributor space within the crystal suspension fed to the distributor space can also have corresponding effects.

This results in inhomogeneities in the crystal bed forming before the second end of the column (45), which inhomogeneities cause a reduction in the effect of the washing with wash melt ascending in the column (45).

This can be remedied by using the novel distributor aids.

The drawings below illustrate preferred embodiments of the invention, wherein as a brief description of the drawings:

FIG. 1 schematically shows the basic structure of a hydraulic wash column according to the known prior art;

Figure 1:
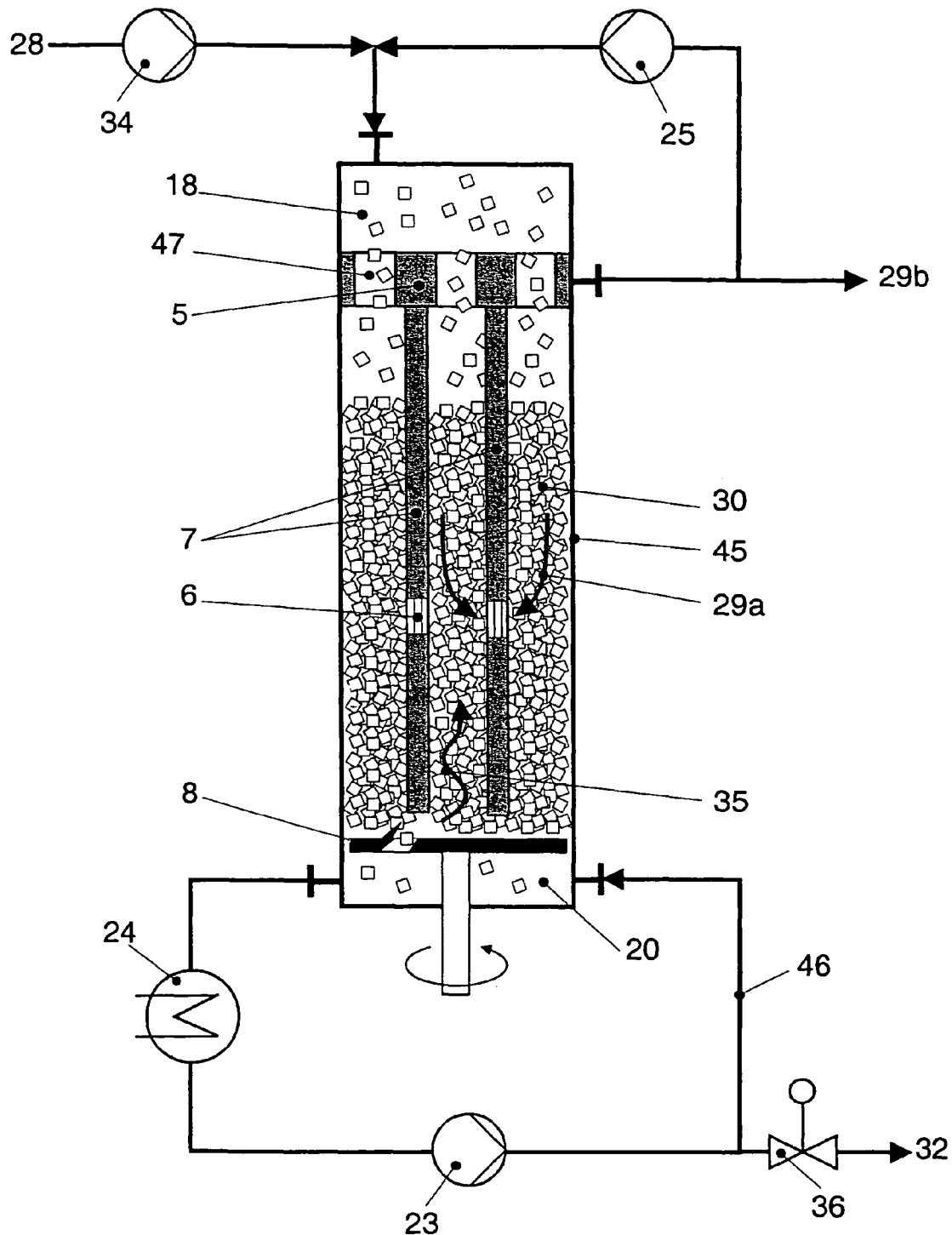

FIG. 1 attached to this document schematically shows the basic structure of a hydraulic wash column according to the known prior art. Its principle of operation is described below by way of example with reference to an acrylic acid suspension to be separated with purification.

The suspension (28) of acrylic acid crystals in impure acrylic acid melt (mother liquor) is taken off, for example, from a suspension crystallizer and is fed, by means of a pump (34) and/or by means of a hydrostatic head under superatmospheric pressure, into the suspension distribution space (18) of the wash column (45). The suspension is distributed over the cross section of the wash column by means of passages (47). For example, the continuous interior of a fluid register can serve as an apparatus (5) for collecting and removing impure acrylic acid melt (mother liquor and wash melt) (29*b*). The filter tubes (also frequently referred to as drainage tubes) (7) (they have, as a rule, a constant cross section up to the first filter (6) (including concentration zone)) which are connected to the collecting space (5) are mounted at the bottom of the fluid register. The filter tubes (7) are each provided, at a defined height, with at least one conventional filter (6) through which the mother liquor (29*a*) from the wash column is removed (the mother liquor may be at atmospheric, superatmospheric or reduced pressure; the hydraulic pressure is usually from 0.1 to 10 bar, often from 1 to 5 bar). A compacted, impure crystal bed (30) forms. The crystal bed is transported past the filters into the zone below the filters by the force resulting from the hydraulic flow pressure drop of the mother liquor. Recycling of a part of the impure acrylic acid melt (29*b*) removed into the suspension distribution space (18) by means of the control loop pump (25) permits regulation of this transport force.

At the lower end of the wash column, the acrylic acid crystals are removed from the crystal bed, for example by means of a slotted rotating knife disk (8) and resuspended in pure product melt, which may be inhibited from polymerization with p-methoxyphenol (MEHQ), in the resuspending space (20) (the MEHQ can be added to the melt circulation as a solution in pure product). This suspension is conveyed in a melt circulation (46) by means of a melt circulation pump (23) via a melter (e.g. heat exchanger) (24), via which the heat required for melting the crystals is introduced indirectly. If required, air for additional polymerization inhibition can be additionally introduced into the melt circulation by means of a nozzle.

A part of the molten crystal is removed from the melt circulation (46) as pure product melt (32). The amount of pure product removed is adjusted by means of the product control valve (36). The remaining part of the pure product melt flows under pressure as wash material (35), in a direction opposite the direction of transport of the crystal bed, to the filters (6), with the result that countercurrent washing of the crystals takes place (wash zone).

Detailed information is contained in WO-0177056. However, a part of the crystal could also be melted directly in the column (45) (for example by means of corresponding installed apparatuses for heating). In this case too, only a part of the melt produced would be removed from the column. The other part ascends as wash melt. In contrast to the prior art, a novel wash column contains distributor aids in the suspension distribution space (18). In the simplest embodiment, for example, said aids may comprise a stirrer.

Figure 2:
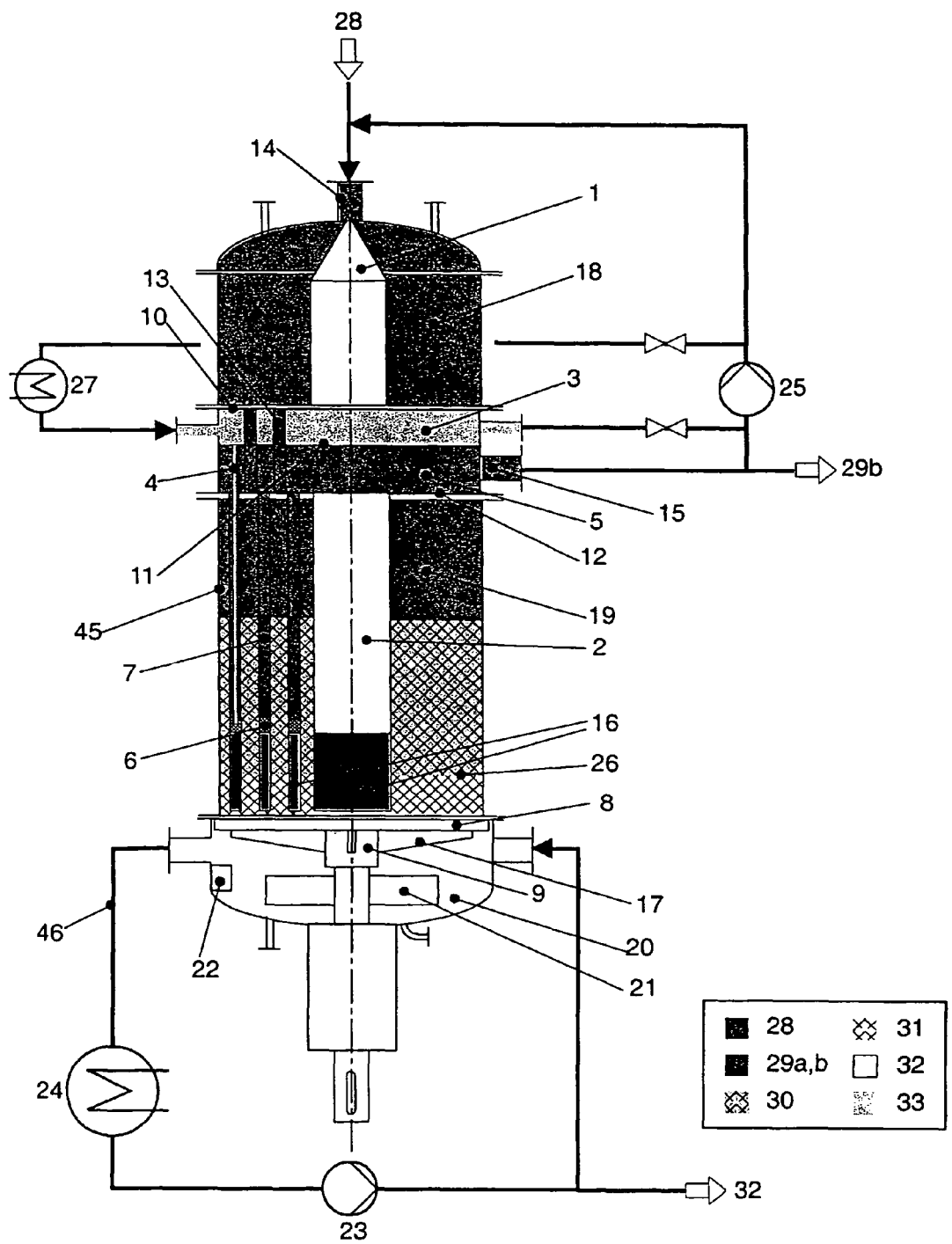
FIG. 2 shows an example of a hydraulic wash column according to the invention and having a distributor cone.

According to the invention, a distributor cone (1), as shown in the novel apparatus in FIG. 2, proves advantageous as a distributor aid. The cone apex of the distributor cone, which expediently projects into the suspension feed nozzle (14), advantageously forms, according to the invention, an annular gap through which the suspension fed in is distributed uniformly over the cross section. Consequently, flowing away through the tray (12) takes place with high homogeneity, considered over the cross section.

Figure 7:
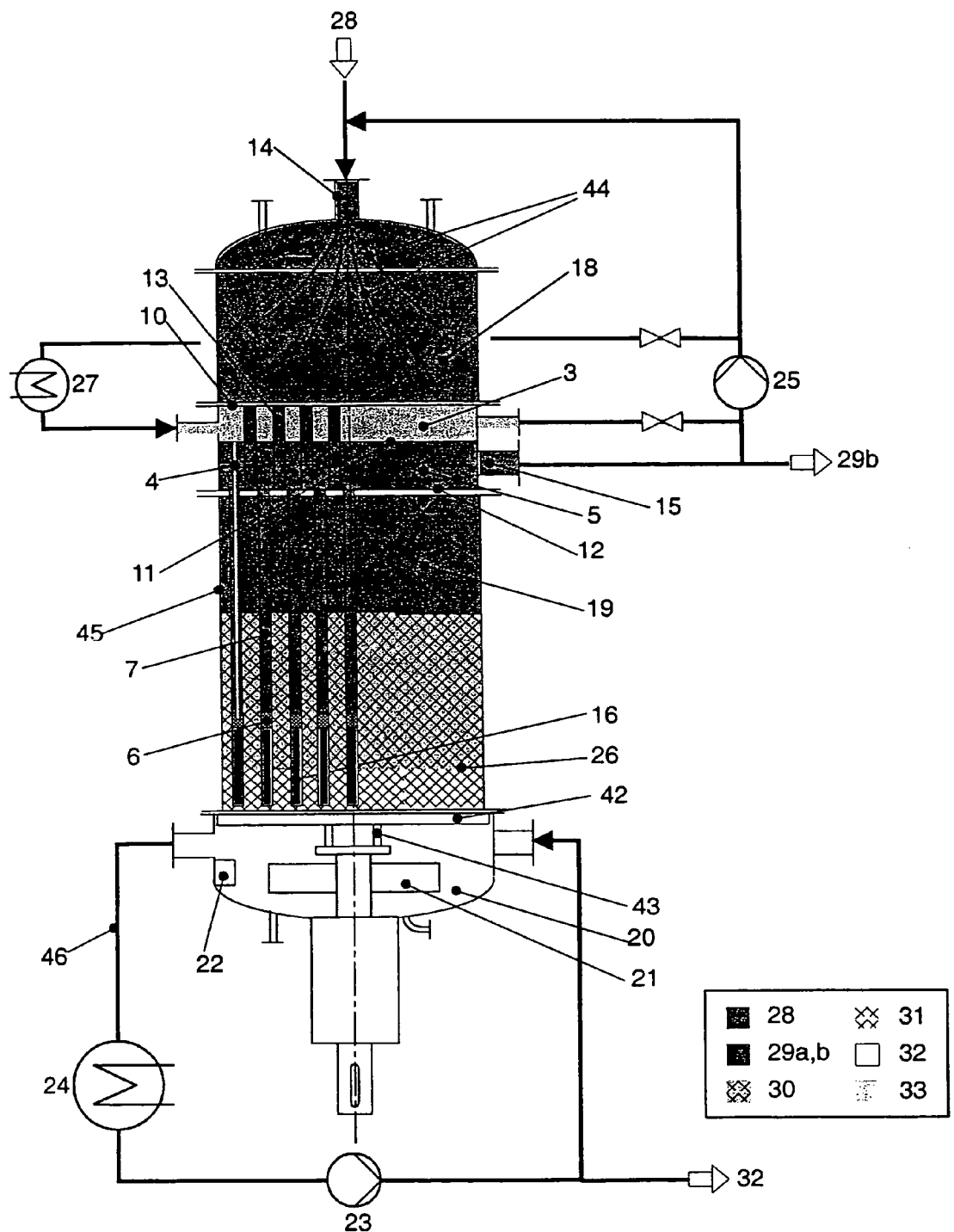
FIG. 7 shows an example of another hydraulic wash column according to the invention and having baffle plates.

Instead of a distributor cone, an arrangement of baffle plates can also be provided in the suspension distribution space, as shown in FIG. 7. Another suitable alternative distributor aid comprises branching of suspension feed channels uniformly over the cross section, which channels all open into the suspension feed nozzle (14).

It is advantageous according to the invention if a tray (12) and a tray (10), which in turn define a cylindrical space, form the boundary between the suspension distribution space (18) and the column (45). Both trays have orifices (preferably circular bores (holes)), of which the orifices of the tray (10) are connected to a part (the second part) of the orifices of the tray (12) via continuous connecting pieces (13) (for example, both orifices open into a connecting pipe section). The suspension to be separated passes via the connecting pieces (13) into the concentration zone of the column (45), i.e. into the space between the filter tubes (7).

The tray (12) additionally has a first part of orifices which have no counter-piece in the tray (10) and open into the filter tubes (7). Preferably, this second part of orifices also, comprises circular bores (holes).

Figure 3:
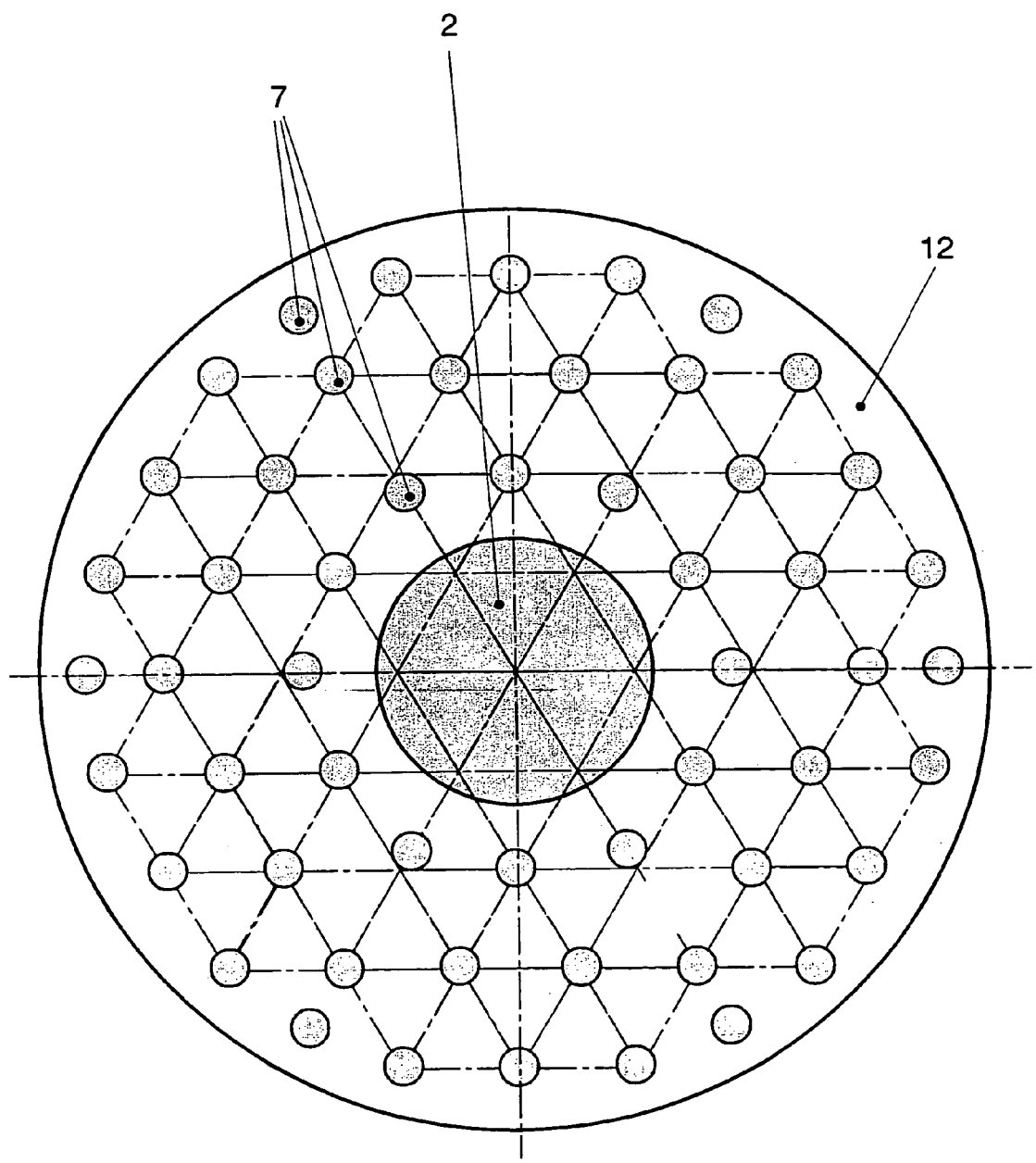
FIG. 3 shows a distributor tray according to the invention.

This first part of orifices, like the filter tube (7) into which these orifices open, is preferably uniformly distributed over the cross section of the tray (12), as shown, for example, in FIG. 3.

Predominantly equilateral triangles are defined by this uniform distribution. It is advantageous according to the invention that the second part of the orifices of the tray (12) is in the center of such triangles. The second part of the orifices is likewise preferably uniformly distributed over the cross section of the tray (12).

It is advantageous according to the invention if substantially all centers of triangles are occupied by orifices belonging to the second part. The space around the connecting pieces (13) forms the collecting space (5) for mother liquor and wash melt, from which space impure melt can be removed via the take-off nozzle (15).

It is preferable if a flushing liquid feed space (3), which can be created by including an intermediate tray (11), is present as a further space between collecting space and suspension distribution space. The connecting pieces (13) are led through the intermediate tray (11) so as to provide a substantial seal. The intermediate tray (11) additionally has orifices (preferably circular bores (holes)) which open into flushing tubes (4) which are distributed in the same manner as the filter tube (7) over the cross section and project into the filter tubes as far as the lower third of the filter element (6). The external diameter of the flushing tube (4) is expediently chosen so that it corresponds to from 0.3 to 0.5 times the internal diameter of the filter tubes (7). In the lower third, centering cams which ensure a central position of the flushing tube (4) in the filter tube (7) are advantageously mounted on the outer wall of each flushing tube (4).

The orifices in the tray (11) are advantageously such that they may be either closed or opened. If they are closed, any desired heating medium can be fed into the space (3) in order to melt crystalline deposits and incrustations on the tray (10) and at the entrance into the connecting pieces (13).

If orifices in the tray (11) are open, crystalline deposits on the filter elements (6) can be melted, for example by using warm mother liquor, warm pure melt or warm solvents as flushing liquid (in the case of acrylic acid, this is always effected with inhibition of polymerization).

As stated above, the filter tubes (7) are provided with a filter (6) at a defined height (cf. WO-0177056). The mother liquor obtained on concentration of the suspension passes via the filters (6) and the interior of the filter tubes into the collecting space (3) and can be removed via a take-off nozzle.

Figure 4:
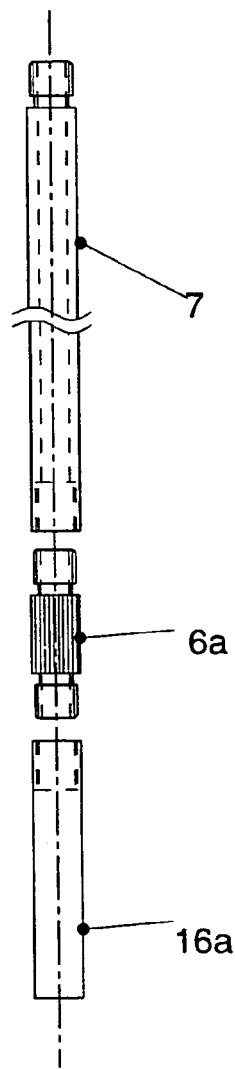
FIG. 4 shows examples of a filter tube according to the invention.
Figure 4:
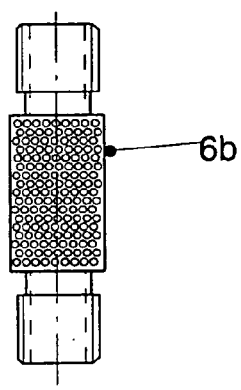
Figure 4:
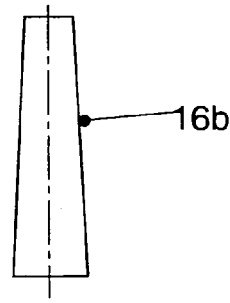
Figure 4:
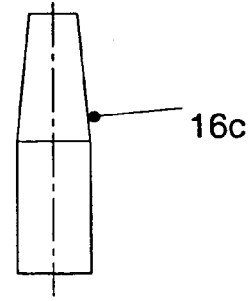

FIG. 4 shows, schematically and by way of example, the design of a filter tube (7). According to the invention, the external diameter thereof is preferably constant over its length, beginning on the tray (12) and ending at that end of the filter (6) which is located opposite to this tray. As a rule, this external diameter is from 20 to 100 mm. Preferred external diameters are 33.7 mm or 48.3 mm. The perforation thereof which produces the filtering effect of the filter element can be in the form of both longitudinal slots (6a) and holes (6b). The slot width and the hole diameter are preferably from 100 to 300 μm.

A filter tube displacer (16) is usually connected to the filter element (6). No liquid is capable of penetrating into said displacer. It may be either cylindrical (16a), conical (16b) or a combination (16c) of these shapes. The connecting external diameter is as a rule identical to the external diameter of the filter element.

According to the invention, the filter tube displacer preferably consists of a material having a low thermal conductivity (e.g. Teflon or polyethylene).

Figure 5:
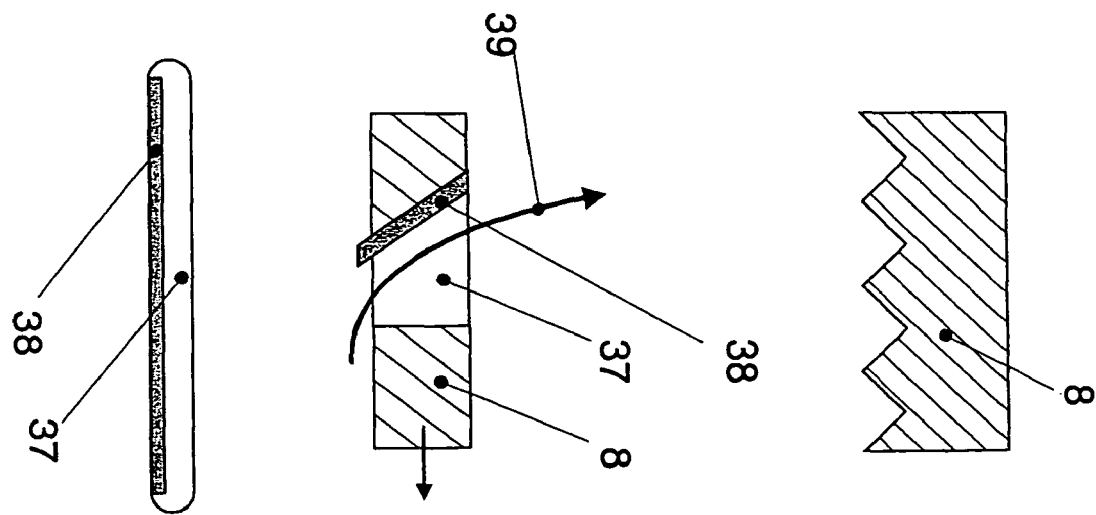
FIG. 5 shows views of a rotating knife disk without solid removal at the center.
Figure 5:
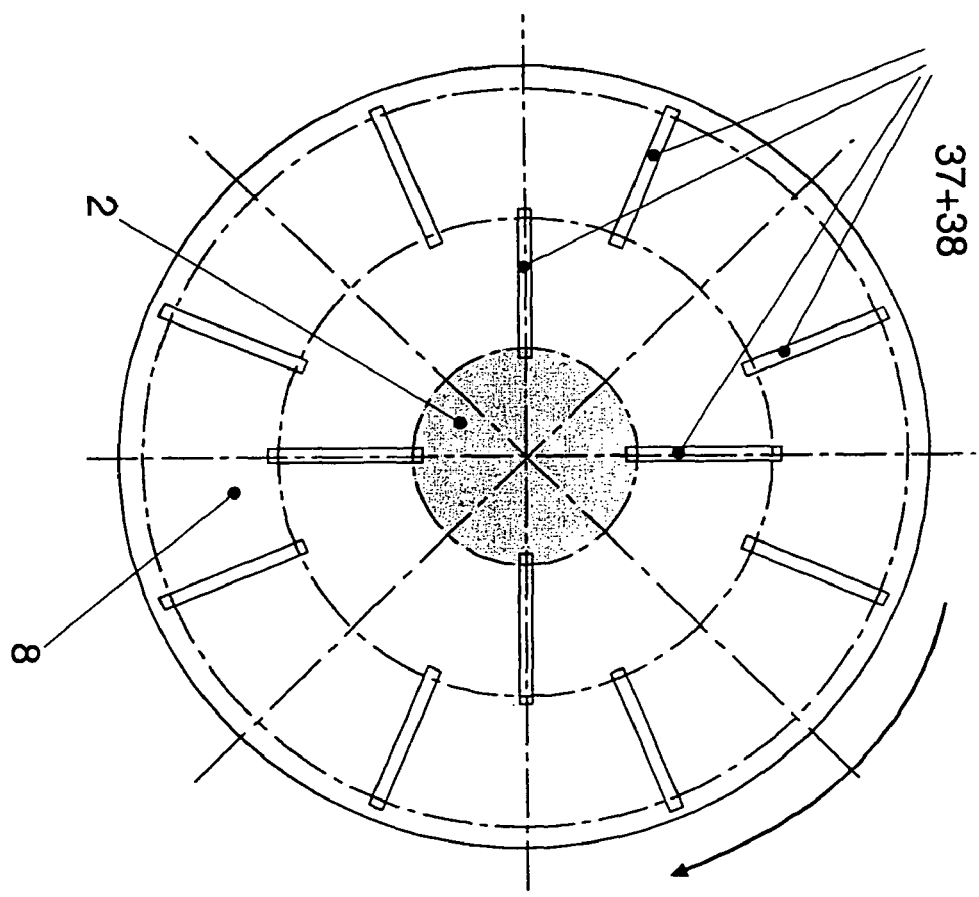

If the rotating knife disk chosen is one which does not result in any removal of solid in the center (FIG. 5 and FIG. 2) it is expedient according to the invention to arrange a central displacer body (2) in the center of the concentration zone and wash zone. At the end facing the melt zone (below the level of the filter elements (6)), the material of said displacer body should likewise consist of a material having low thermal conductivity (e.g. Teflon or polyethylene).

If the longest dimension of the central zone free of solid removal is X, the cross sectional longest dimension of the central displacer body may be from 0.5 X to 2 X, frequently from 0.5 X to 1.5 X, preferably from 0.8 X to 1.2 X. The central displacer body is preferably cylindrical. In this case, it forms an annular product space together with the wall of the cylindrical column (45).

Furthermore, the central displacer body is preferably statically fastened to the tray (12) (which as a rule has no passage and no orifice in the region of the fastening area) and extends up to about 1 to 20 mm above the knife disk. This arrangement permits simple design of the knife disk and uniform scraping away of the crystals in the remaining annular space around the displacer body.

However, it can also be firmly connected to the knife disk and hence designed so as to rotate with said knife disk. The displacer body helps to avoid an inhomogeneous crystal bed density.

In particular cases, the central displacer body can also be designed as a filter tube having a larger cross section and can possess a filter element (6).

Figure 8:
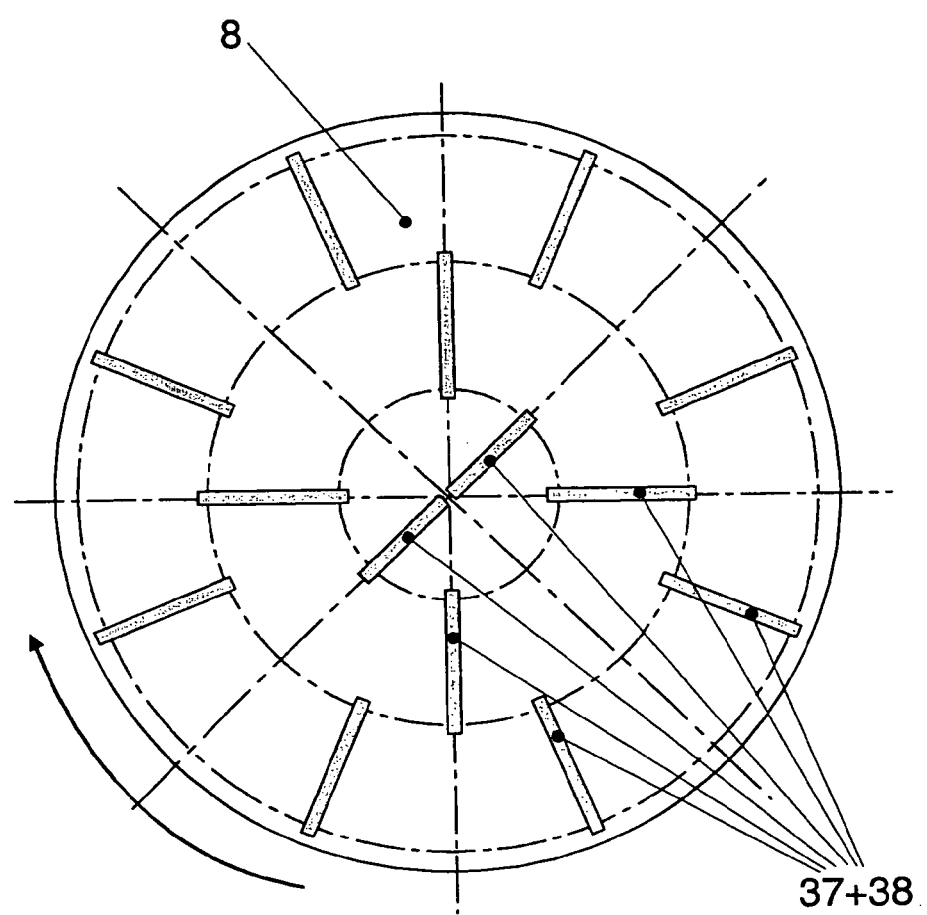
FIG. 8 shows a rotating knife disk with solid removal at the center.

If a rotating knife disk with solid removal in the center is used (FIG. 8 and (42) in FIG. 7), the connection of drive shaft and knife disk is chosen so as to allow through crystals which have been removed (43).

According to the invention, the region comprising the concentration zone and comprising the wash zone is advantageously terminated by a rotating knife disk (8), by means of which the crystals are removed from the thickened crystal cake. They then advantageously pass via a resuspending space (20) into the melt circulation (into the melt zone) (46), from which they are partly discharged in molten form.

The knife disk (FIG. 5 and FIG. 8) is provided with preferably radially oriented slots (37) which are distributed over the cross section in such a way that roughly the same amount of crystals passes through each slot (37) during a revolution.

Each slot is equipped with an obliquely arranged blade (knife) (38), by means of which the crystals are scraped off from the crystal cake. The surface of the knife disk is preferably profiled (8) in order to ensure a very uniform distribution of the wash melt.

It is furthermore advantageous according to the invention to choose the diameter of the knife disk (8) to be from 5 to 100 mm greater than the internal diameter of the cylindrical column (45). In order to improve the resuspending of the scraped-off crystals below the knife disk, it is helpful if paddles (21) which thoroughly mix the resuspending space are fastened below the knife disk. For this purpose, large-area strengthening elements (17) can also be provided between shaft hub and knife disk.

The mounting of baffles (22) also proves advantageous for the resuspending.

The drive shaft (9) of the knife disk is sealed in an advantageous manner by means of a double-acting axial face seal (e.g. from Crane). For absorbing the radial and axial forces, the drive shaft (9) is expediently provided with two radially acting roller bearings and one axially acting roller bearing.

Figure 6:
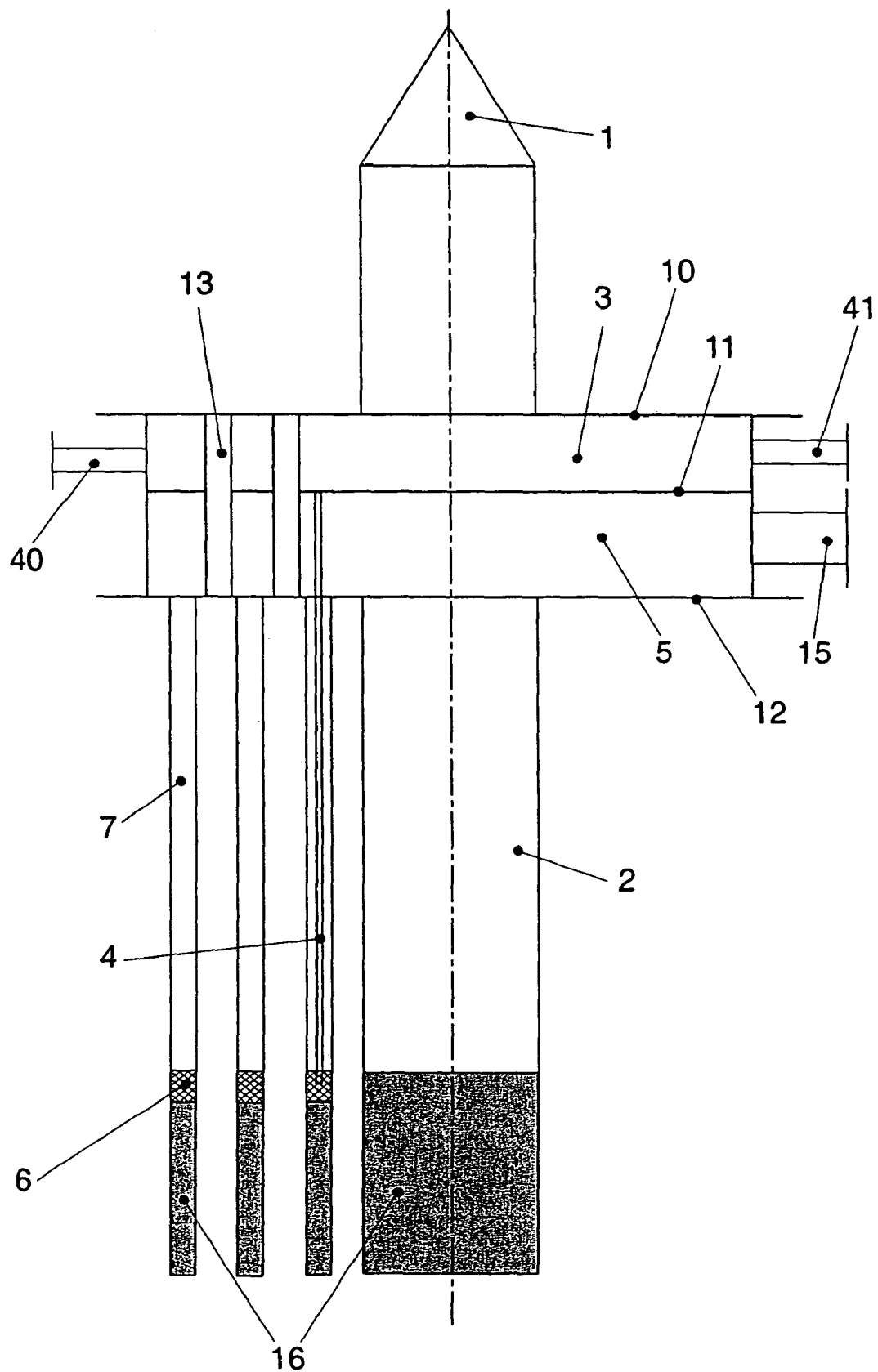
FIG. 6 shows important internal features of a hydraulic wash column according to the invention.

FIG. 6 shows, once again as an overview, the internals considered to be particularly expedient for the novel apparatus (wash column).

The novel apparatus is particularly suitable for separating acrylic acid crystals from their suspension in contaminated acrylic acid melt with purification, as described in WO-0177056. However, it was also suitable in the case of other crystal suspensions, as described, for example, in EP-A 97405 for xylene suspensions. N-Vinylpyrrolidone suspensions and methacrylic acid suspensions may also be mentioned in this context.

In the case of acrylic acid, pumps of the rotary piston pump and/or centrifugal pump types are preferably used as pumps (34), (25) and (23). Apart from the displacers, stainless steel, in particular stainless steel of grade 1.4571, or a nickel-based alloy is recommended as material for the novel wash columns. This also applies to the filter elements (in particular in the case of an acrylic acid application).

According to the invention, the number of filter tubes can be from 3 to 200 in the case of an industrial application. The length of the filter tubes is typically from 500 to 2 000 mm and the length of the filter elements is frequently from 20 to 200 mm, while the length of the filter tube displacers is usually from 100 to 500 mm. The internal diameter of the column (45) may be from 300 to 3 000 mm.

According to the invention, it is also advantageous if the crystal suspension to be treated is fed to the suspension distribution space via a plurality of distributed feed points. In general, structural elements which are capable of deflecting the existing flow fields of the crystal suspension fed in and/or of superposing a new flow field on the crystal suspension are suitable as novel distributor aids. Ideally, an identical crystal suspension flows through each of the connecting pieces (13). The filter tubes (7) can be screwed or welded into the trays (12). The same applies to the flushing tubes (4). The connecting tubes (13) are welded into the trays (10), (12).

In addition, the spaces (5) and (3) preferably have housing nozzles which are mounted on both sides and possess covers. As a result of the removability ensured thereby, the spaces (5) and (3) are accessible, which may be advantageous, for example, for removing undesired polymer formation (for example in the case of acrylic acid).

It is also advantageous according to the invention if the housing of the wash column is insulated at least with respect to the environment in the region of the crystal bed. Preferably, however, heating is effected in this region by means of trace heating (from 0 to 20° C. in the case of acrylic acid). This heating is advantageously realized zone-by-zone (for example, a first heating zone (from 12 to 17° C. in the case of acrylic acid) for the region of the purified crystal bed below the wash front and a second heating zone (from 0 to 15° C. in the case of acrylic acid) for the region above the wash front).

Otherwise, the numerical references in this document have the following meaning:

1=Distributor cone
2=Central displacer (body)
3=Flushing liquid (feed) space
4=Flushing tube
5=Liquid (mother liquor) collecting space
6=Filter element
6a=Filter element with longitudinal slots
6b=Filter element with holes
7=Filter tube
8=Rotating knife disk
9=Connection of knife disk/drive shaft (=hub)
10=Upper perforated tray
11=Intermediate tray
12=Lower perforated tray
13=(Suspension transport) tube
14=Suspension feed nozzle
15=Liquid (mother liquor) take-off nozzle
16=Displacer (body) of poorly heat-conducting material
16a=Cylindrical displacer
16b=Conical displacer
16c=Conical/cylindrical displacer
17=Strengthening (rib)
18=Suspension distribution space
19=Concentration space and wash space
20=Resuspending space
21=Paddle or stirrer blade
22=Baffle
23=Melt circulation pump
24=Heater in melt circulation (melter)
25=Control loop pump
26=Wash front
27=Heater for flushing liquid
28=Suspension
29a=Mother liquor
29b=Mother liquor+wash liquid
30=Compacted crystal bed (impure)
31=Compacted crystal bed (pure)
32=Pure product melt
33=Warm flushing liquid
34=Suspension feed pump
35=Wash liquid
36=Product melt take-off valve
37=Slot in rotating knife disk
38=Knife
39=Crystals scraped off by the knife during rotation of the disk
40=Flushing liquid feed nozzle
41=Flushing liquid discharge nozzle
42=Rotating knife disk with solid removal in the center
43=Drive shaft/knife disk connection open for solid removal
44=(Suspension) distribution plates
45=Cylindrical column comprising concentration zone+ wash zone
46=Melt zone
47=Passages

We claim:

1. An apparatus for separating crystals from their suspension in contaminated crystal melt with purification, comprising:
   a hollow cylindrical column that bounds a concentration zone and a wash zone, wherein the hollow cylindrical column has a central axis;
   one or more filter tubes extending through the column from a first end of the column parallel to a cylinder axis;
   at least one filter that forms an only direct connection between an interior of the filter tube and an interior of the column being mounted in a wall of the filter tube;
   a concentration zone being terminated at the first end of the column which is opposite the at least one filter by a tray having orifices;
   a first part of the orifices of the tray being continued into the filter tube and simultaneously into an apparatus for removing contaminated crystal melt;
   a second part of the orifices of the tray being connected to a distributor space into which the crystal suspension to be separated is fed; and
   wherein the column opens, at its second end opposite the first end, into a zone for melting crystals that have been separated off, which zone has an outlet for removing a portion of the molten crystals separated off, and
   wherein an interior of the distributor space is equipped with at least one distributor aid, and wherein the column, in the concentration zone and in the wash zone, comprises a central displacer body coaxial with said central axis.

2. An apparatus as claimed in claim 1, wherein the at least one distributor aid comprises a distributor cone.

3. A process for separating crystals from their suspension in contaminated crystal melt with purification, which is carried out in an apparatus as claimed in claim 1.

4. A process as claimed in claim 3, wherein the crystals are crystals of acrylic acid.

5. An apparatus as claimed in claim 1, wherein the material of the central displacer body at a height below the at least one filter consists of Teflon or polyethylene.

6. An apparatus as claimed in claim 1, wherein the central displacer body is cylindrical.

7. An apparatus as claimed in claim 1, wherein the central displacer body has a cross section larger than said filter tubes, wherein at least one filter is mounted in the central displacer body.

8. A process for separating crystals from their suspension in contaminated crystal melt with purification, which is carried out in an apparatus as claimed in claim 5.

9. A process as claimed in claim 8, wherein the crystals are crystals of acrylic acid.

10. A process for separating crystals from their suspension in contaminated crystal melt with purification, which is carried out in an apparatus as claimed in claim 6.

11. A process as claimed in claim 10, wherein the crystals are crystals of acrylic acid.

12. A process for separating crystals from their suspension in contaminated crystal melt with purification, which is carried out in an apparatus as claimed in claim 7.

13. A process as claimed in claim 12, wherein the crystals are crystals of acrylic acid.

14. A process for production of acrylic acid by separating crystals of acrylic acid from their suspension in contaminated crystal melt with purification, which is carried out in an apparatus as claimed in claim 1.

15. A process for production of acrylic acid by separating crystals of acrylic acid from their suspension in contaminated crystal melt with purification, which is carried out in an apparatus as claimed in claim 5.

16. A process for production of acrylic acid by separating crystals of acrylic acid from their suspension in contaminated crystal melt with purification, which is carried out in an apparatus as claimed in claim 6.

17. A process for production of acrylic acid by separating crystals of acrylic acid from their suspension in contaminated crystal melt with purification, which is carried out in an apparatus as claimed in claim 7.

18. An apparatus as claimed in claim 1, wherein the wash zone extends between said outlet and said at least one filter.

19. An apparatus as claimed in claim 1, wherein the concentration zone and the wash zone are terminated by a rotating knife for removing crystals, wherein the knife is configured such that it does not substantially remove crystals at the center of the cylindrical column.

20. An apparatus for separating crystals from their suspension in contaminated crystal melt with purification, comprising:

a hollow cylindrical column having a vertical central axis;

a suspension feed inlet provided at n upper portion of said column for introducing a suspension of crystals suspended in a contaminated crystal melt into a distribution space of the column;

at least one distributor aid in the distribution space for distributing the suspension evenly in the distribution space;

a tray provided in the column at a location for receiving the distributed suspension in the distribution space, the tray dividing the column into the distribution space above the tray and a concentration and wash zone below the tray, wherein the tray includes orifices to permit the passage of the suspension in the distribution space into the concentration and wash zone;

one or more filter tubes extending from the tray into the concentration and wash zone, and parallel to the vertical central axis, the filter tubes each having at least one filter that forms an only direct connection between an interior of the filter tube and an interior of the column, the filter tubes being connected to the tray for removing contaminated crystal melt from the concentration and wash zone, whereby crystals in the suspension in the concentration and wash zone form a bed of concentrated crystals;

a rotating knife provided at the lower end of the concentration and wash zone for removing crystals from the bed of concentrated crystals, wherein the knife is positioned and configured such that it does not substantially remove crystals in the bed of concentrated crystals adjacent the vertical central axis of the cylindrical column;

a central displacer body in the concentration and wash zone, provided coaxial with said central axis and connected to one of the tray and the rotating knife; and a zone below said rotating knife for receiving melting crystals that have been separated off by said rotating knife, which zone has an outlet for removing a portion of the molten crystals separated off by said rotating knife.

21. An apparatus as claimed in claim 20, wherein the central displacer body has a cross section larger than said filter tubes, wherein at least one filter is mounted in the central displacer body.

* * * * *